May 21, 1963  H. P. FREEMAN ETAL  3,090,614
MOUNTABLE AND DISMOUNTABLE GRIP AND HOLDER ASSEMBLY
Filed March 16, 1961
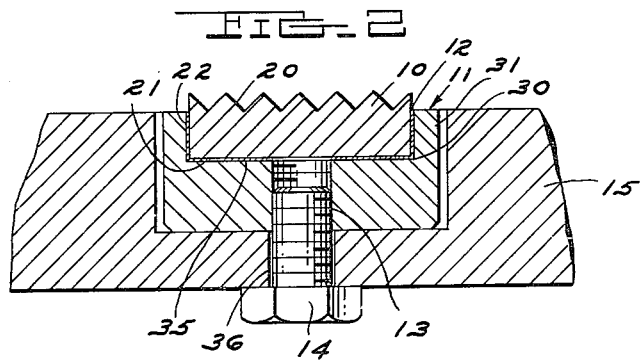
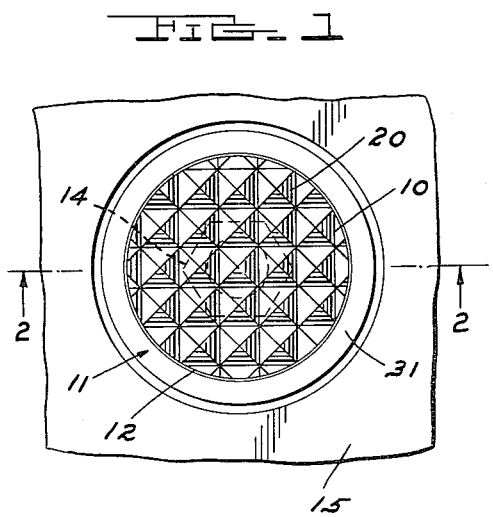
INVENTORS
HAROLD P. FREEMAN
JAMES P. FREEMAN
BY
ATTORNEY United States Patent Office 3,090,614
Patented May 21, 1963

3,090,614
MOUNTABLE AND DISMOUNTABLE GRIP AND HOLDER ASSEMBLY
Harold P. Freeman, 27677 Doreen St., Farmington, Mich., and James P. Freeman, 23541 Lee Baker Drive, Southfield, Mich.
Filed Mar. 16, 1961, Ser. No. 96,291
2 Claims. (Cl. 269—273)

This invention relates to an easily mountable and dismountable grip and holder assembly for gripping and holding workpieces as an element of machine tool workpiece handling means.

Workpiece grips have been employed heretofore to facilitate the handling and holding of workpieces, however the several devices of the prior art have not proven entirely satisfactory inasmuch as they are welded or otherwise fixedly integrated directly with the handling means so that they are difficult to mount, difficult to remove, and difficult to remount when they wear out or break from excessive use.

With the advent of the automated machinery, such as huge and intricate transfer machines, the gripping means which hold the workpiece at a station and move the workpieces from one station to another have become exceedingly important in that the workpieces must be securely and accurately gripped without any slipping occurring and also the grips must be of an excessively hard material so that they can imbed themselves in the metal workpieces that the relatively heavy workpieces may be lifted and held during machining and transfer operations. The use of sintered tungsten carbide grips having a serrated or diamond faced formation have been extensively employed and they have been connected to the machine handling arms and other equipment by welding the carbide grips on the arms themselves so that upon the grips wearing out or breaking due to excessive use, the grip must be chiseled off the machine and then a new grip rebrazed or welded thereon.

Obviously, delaying the use of a three hundred to six hundred foot long automatic transfer machine having a high-productive capacity for the maintenance purpose of chiseling off a tungsten carbide grip and rewelding a new one in its place results in excessively expensive downtime wherein all the stations of the machine are held up for the repair of one workpiece holding grip.

With the foregoing in view, the primary object of the invention is to provide a workpiece grip and holder assembly particularly suitable for automated production lines which is quickly and easily mounted, quickly and easily dismounted, and quickly and easily replaced with minimum effort and time being used so that the replacing of a grip assembly does not cause a shutdown of the transfer machine.

An object of the invention is to provide a sintered tungsten carbide grip having a serrated or diamond shaped pointed workpiece contacting surface so that it can easily imbed itself in the material of a workpiece to assure a firm and secure grip.

An object of the invention is to provide a holder having a socket portion for receiving the grips surrounded by a side wall in the area of the grip side wall below the serrated face portion so that the grip element is securely supported on the bottom and sides.

An object of the invention is to provide welding material or other bond permanently fixing the grip with the holder assembly so that they are permanently connected and so that the brittle grip is adequately and evenly and cushion-wise supported by the holder assembly.

An object of the invention is to provide means for connecting the holder assembly to the machine element such as providing a threaded aperture in the holder assembly for receiving a connecting bolt therein for quickly and easily demountably mounting the grip assembly on a machine element.

These and other objects of the invention will become apparent by reference to the following description of a grip and holder assembly embodying the invention taken in connection with the accompanying drawing in which:

FIG. 1 is a top-plan view of the grip and holder assembly mounted on a machine element showing the machine element broken away; and FIG. 2 is a cross-sectional view of FIG. 1 taken on the line 2—2 thereof.

Referring now to the drawing wherein like numerals refer to like in corresponding parts throughout the several views, the easily demountably mountable grip and holder assembly particularly suitable for automated production lines comprises a grip 10 permanently fixedly mounted in the holder 11 via the welding material 12 with the holder 11 having a threaded aperture 13 for receiving the bolt 14 or an extending threaded screw for connecting the holder and grip to a machine element 15.

More particularly, the grip 10 comprises a tungsten carbide pad having a raised serrated face portion 20 preferably of diamond shaped configuration presenting points towards a workpiece, a bottom portion 21 opposite the face portion 20, and a peripheral edge portion 22 below the serrated face portion 20 and leading to the bottom portion 21. The holder 11 preferably includes the receiving socket or counter-sunk area 30 to lie below the grip bottom portion 21 and upstanding side walls 31 surrounding the countersunk area 30 and also surrounding the peripheral side walls 22 of the grip 10. The holder 11 and grip 10 are fixedly interconnected by the brazing, bonding, or welding material 35 disposed between the grip bottom 21 and grip sides 22 on the one hand and the holder area 30 and side walls 31 on the other hand so that the grip 10 is completely supported at the bottom and sides by the holder with the serrated face portion 20 of the grip 10 extending there above for the purpose of being completely exposed for gripping a workpiece.

Preferably, the machine element or arm 15 can also be counter-sunk to receive the grip and holder assembly and the machine element is provided with an aperture 36 for receiving the bolt 14 or a threaded hole for receiving an extending screw on the holder assembly so as to easily connect the holder 11 to the machine element 15. Obviously, the holder need not be counter-sunk in the arm.

In manufacturing the device it is only necessary to decide the size and shape of the grips and make them accordingly and then to machine the holder 11 so as to be in slight spaced relationship to the grip 10 prior to the welding or brazing. It has been found that by placing brazing or welding material in the holder, pressing the grip 10 thereinto, and then electrically heat-flowing the bonding material permanently fixes the grip and holder together in completely intersupported relationship.

Due to the fact that the grip is excessively hard it has a long wearing characteristic but since it is hard it is also brittle and in the event that the grip cracks or becomes otherwise dull through excessive use the entire assembly is easily replaced by removing the bolt 14 and placing a like grip and holder in its place on the machine element 15. The holder cushion-wise supports the grip uniformly.

The inventive device with these features constitutes a compact, durable, neat appearing, and easily manufactured and easily placed and replaced grip with high utility in the automatic machinery field.

Although but a single embodiment of the invention

We claim:

1. An easily accurately mountable and easily dismountable grip and holder member assembly particularly suitable for automated production lines wherein workpieces are automatically handled and machined comprising a tungsten carbide grip having a serrated face portion for gripping a workpiece by being pressed thereagainst with force so as to imbed therein, a bottom portion opposite said face portion and a peripheral edge portion between said serrated face portion and to said bottom portion; a holder member for said grip having a face portion including a grip receiving socket defined by a counter-sunk area adapted to lie below said grip bottom portion and upstanding side walls rising above said holder member socket counter-sunk area adapted to surround said peripheral edge portion; and a permanent bonding element such as a weld disposed between said grip bottom and peripheral edge and said holder member socket counter-sunk area and upstanding side walls fixedly interconnecting said grip and holder member together with said grip serrated face portion extending above said holder member socket side walls; said holder member having a back portion opposite to and lying in a plane parallel to its said face portion having a threaded aperture for receiving a threaded bolt therein for accurately mounting and securing said grip and holder member assembly on a machine workpiece handling element.

2. An easily mountable and dismountable grip and holder member assembly particularly suitable for automated production lines wherein workpieces are automatically handled and machined, comprising a grip having a raised serrated face portion for gripping a workpiece by being pressed thereagainst with force so as to imbed therein, a bottom portion opposite said face portion and an edge portion leading from said serrated face portion to said bottom portion; a holder member for said grip having a face portion including a grip receiving socket including a counter-sunk area adapted to lie below said grip bottom portion and upstanding side walls rising above said counter-sunk area adapted to surround said grip peripheral edge portion; and a permanent bonding element such as a weld disposed between said grip bottom and said grip peripheral edge and said holder member socket counter-sunk area and upstanding side walls respectively fixedly interconnecting said grip and holder member together with said grip serrated face portion extending above said holder member socket sidewalls; said holder member having a back portion opposite its said face portion having attaching means for mounting and securing said grip and holder assembly on a machine handling element quickly and easily and also for removing same quickly and easily for replacing same upon wearing out or breaking during use thereby saving machine down-time and labor previously involved with welding the grips directly on the machine handling element and chiseling same off and rewelding a replacement upon same wearing out or breaking during use.

References Cited in the file of this patent

UNITED STATES PATENTS

| | | |
|---|---|---|
| 1,289,416 | Ellenbogen | Dec. 31, 1918 |
| 1,599,808 | Coates | Sept. 14, 1926 |
| 2,326,962 | Meier | Aug. 17, 1943 |
| 2,734,409 | Schum et al. | Feb. 14, 1956 |
| 2,795,225 | Sovatkin et al. | June 11, 1957 |
| 2,939,699 | Patt | June 7, 1960 |

FOREIGN PATENTS

| | | |
|---|---|---|
| 793,030 | Great Britain | Apr. 4, 1958 |